UNITED STATES PATENT OFFICE.

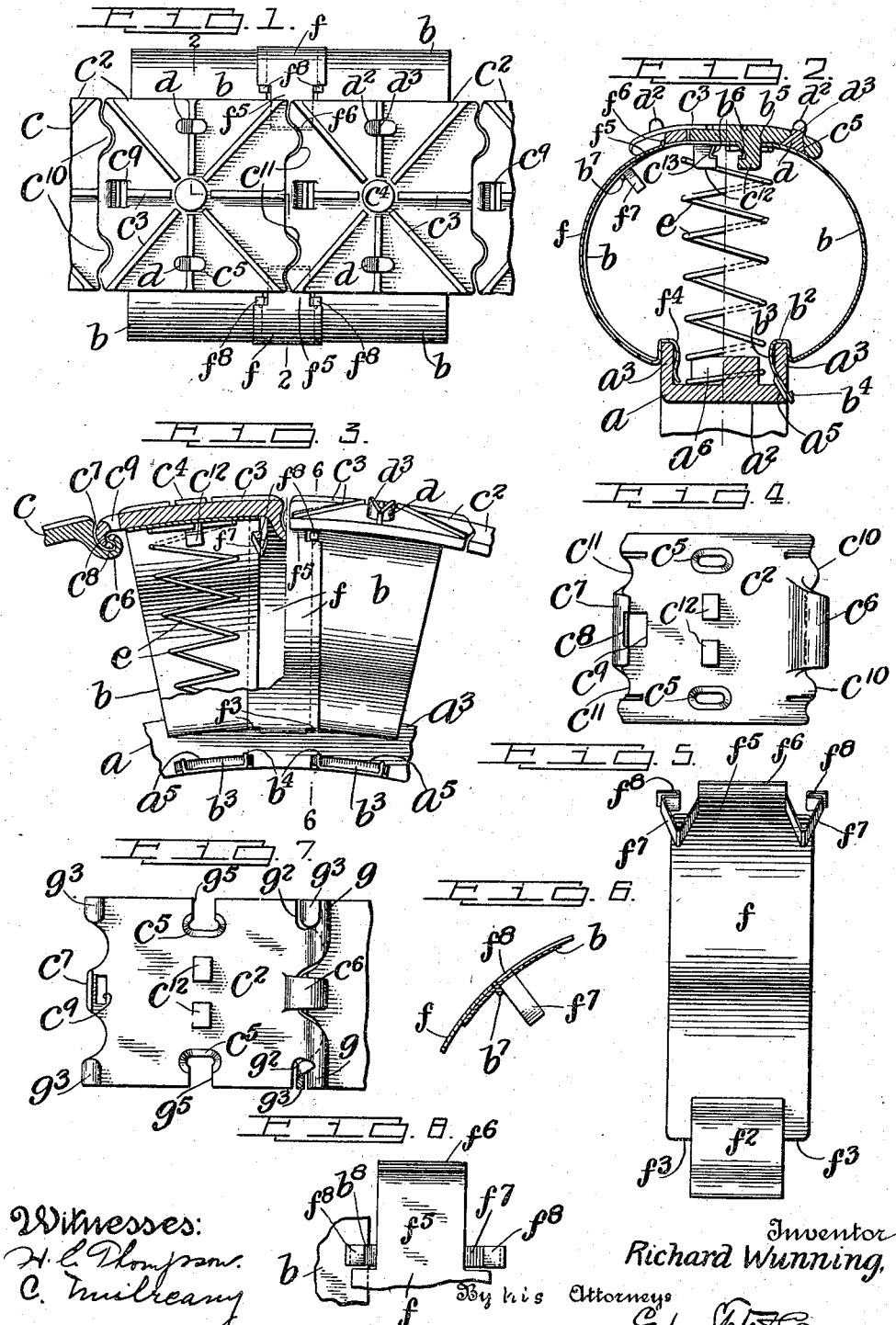

RICHARD WUNNING, OF NEW YORK, N. Y.

WHEEL RIM AND TIRE.

1,227,988.    Specification of Letters Patent.    Patented May 29, 1917.

Application filed February 12, 1916. Serial No. 77,976.

*To all whom it may concern:*

Be it known that I, RICHARD WUNNING, a citizen of the United States, and residing at New York, in the county of New York and State of New York, have invented certain new and useful Improvements in Wheel Rims and Tires, of which the following is a specification, such as will enable those skilled in the art to which it appertains to make and use the same.

This invention relates to vehicle wheel rim and tire constructions, and the object thereof is to provide a construction of this class which will obviate the necessity of using pneumatic, rubber or similar spring tires and shoes on automobiles and other vehicles and which may be easily repaired when necessary and which will also be comparatively inexpensive, and with this and other objects in view the invention consists in a wheel rim and tire constructed and operating as hereinafter described and claimed.

The invention forming a basis of this application is an improvement on that described and claimed in application No. 64,838 filed Dec. 3, 1915 and application No. 5,347 filed Feb. 1, 1915, and said invention is fully disclosed in the following specification, of which the accompanying drawing forms a part, in which the separate parts of my improvement are designated by suitable reference characters in each of the views, and in which:—

Figure 1 is a top plan view of a part of a wheel rim and tire construction made according to my invention;

Fig. 2 a transverse sectional view on the line 2—2 of Fig. 1;

Fig. 3 a side view of the construction shown in Fig. 1 but partially in section;

Fig. 4 an inside face view of one of a number of tread or tire plates which I employ;

Fig. 5 an inside view of one of a number of supplemental spring loop or bow members which I employ and on an enlarged scale and two of which are shown in Figs. 1 and 3.

Fig. 6 a partial section on the line 6—6 of Fig. 3;

Fig. 7 a view similar to Fig. 4 but showing two tread or tire plates and showing a modification; and, Fig. 8 an outside detail view of a part of the supplemental spring loop or bow member shown in Fig. 5 and showing a modification of the means for securing it in position.

In the practice of my invention, I provide a wheel rim $a$ which is U-shaped in form in cross section, or composed of an annular plate member $a^2$ provided with outwardly directed annular side flanges $a^3$, and in connection therewith I employ a tire construction involving spring loop or bow members $b$ and a tread member $c$, said spring loop or bow members being arranged radially and transversely of the rim and composed of sheet metal strips and open at their inner sides and preferably connected with the rim as shown at the right side of Fig. 2.

In making this connection, the side flanges $a^3$ of the rim are provided closely adjacent to the annular plate member $a^2$ with inwardly and outwardly inclined slots $a^5$. The end portions of the spring loop or bow members $b$ are formed into outwardly directed loop members $b^2$ having inwardly and outwardly directed tongues $b^3$ which are passed inwardly and outwardly through the slots $a^5$ and are provided at their end corners with catches or lugs $b^4$ which normally serve to prevent the withdrawal of the tongue members $b^3$ and to hold the inner ends of the loop or bow members $b$ in connection with the rim. The slots $a^5$ in the rim are of sufficient dimensions, as shown in Fig. 2, to permit the tongues $b^3$ of the loop or bow members with the catches or lugs $b^4$ to pass through said slots, after which the spring action of these parts cause the catches or lugs to engage with the flanges $a^3$ and hold the loop or bow members in position, and this operation is, of course, facilitated and rendered more positive by the loop members $b^2$ which engage the side flanges of the rim.

The tread member $c$ is composed of separate blocks $c^2$ which are approximately rectangular in form and these blocks are concave in cross section on their inner sides and on their outer sides they are provided with radial ribs $c^3$, and in the construction shown with central knobs or projections $c^4$ which are of the same depth as the radial ribs, and in the central transverse line of each block and cutting the central transverse ribs are formed apertures $c^5$ which are conical in form, and in which are placed conical plugs $d$ which bear on the spring loop or bow members $b$ and which are provided with projections $d^2$ which are preferably of slightly greater depth than the ribs $c^3$ and in which are V-shaped recesses $d^3$.

The tread blocks $c^2$ are each provided at one end, in the form of construction shown in Figs. 1 to 4 inclusive, with a central elongated and inwardly, circumferentially and outwardly curved hook $c^6$, and at the opposite end with an inwardly and backwardly curved hook $c^7$, and these hooks are provided in their edges with elongated recesses $c^8$, and each tread block is provided adjacent to the hook $c^7$ with an aperture $c^9$, and each of said tread blocks is also provided in one end with projecting knobs $c^{10}$ and at the other end with corresponding recesses $c^{11}$, and when the tread blocks $c^2$ are connected as shown in Figs. 1 and 3 the knobs $c^{10}$ of one block enter the corresponding recesses $c^{11}$ of the adjacent block.

The loop or bow members $b$ are provided centrally of their outer or tread portion with apertures $b^5$ having inwardly and outwardly directed and diverging tongues or prongs $b^6$, and the tread blocks $c^2$ are provided with inwardly directed, lugs or projections $c^{12}$ which pass through the apertures $b^5$ and are provided at their inner sides with recesses $c^{13}$ which receive the tongues or prongs $b^6$ when the lugs or projections $c^{12}$ are forced inwardly in the operation of connecting the tread blocks with the loop or bow members $b$, and placed in said loop or bow members, in the form of construction shown, are radially arranged spiral springs $e$ the inner ends of which fit around corresponding lugs or projections $a^6$ formed in the rim $a$, while the outer ends thereof encircle the lugs or projections $c^{12}$ on the tread blocks $c^2$ and bear on the inner surfaces of the outer parts of the loop or bow members $b$.

The method of connecting the tire or tread blocks $c^2$ with the loop or bow members $b$ as herein described and the spiral springs $e$ and the method of their application form no part of the invention described and claimed herein, these parts and the method of their construction and use being similar to corresponding parts shown and described in the applications hereinbefore referred to. In this case, however, I provide means for reinforcing the spring loop or bow members $b$ and for preventing dirt, stones and other articles or substances from passing in through the spaces between said loop or bow members and interfering with the operation thereof. This means consists of supplemental arc-shaped or bow spring devices $f$ made of sheet metal and so placed as to overlap the spaces between the loop or bow members $b$ on each side of the rim and tire construction, and said devices are provided at their inner ends with central spring tongues $f^2$ at the opposite sides of which are shoulders or projections $f^3$, and said spring tongues are formed into loop members $f^4$ which engage the side flanges $a^3$ of the rim $a$, as shown in Fig. 2, while the shoulders or projections $f^3$ abut against said side flanges, and the outer ends of said devices are provided with central tongues $f^5$ which pass beneath the abutting ends of the tread blocks $c^2$ as shown in Fig. 2, and are provided with upwardly directed loops $f^6$ which fit in corresponding recesses in the bottom surfaces of said abutting ends of the tire blocks, and the corners of the outer ends of the parts $f$ are provided with inwardly directed V-shaped members $f^7$ formed integral with the opposite side edges of the tongues $f^5$ and provided at their ends with loops $f^8$ which engage the adjacent edges of the spring loop or bow members $b$, as shown in Figs. 3 and 6, and the loop or bow members $b$ are provided where the parts $f^7$ and $f^8$ engage the same with inwardly directed projections $b^7$ to prevent the slipping of the parts $f^7$—$f^8$ on said loop or bow members $b$.

In the construction shown in Fig. 8, the loop or bow members $b$ instead of being provided with the inwardly directed projections $b^7$ are provided with recesses $b^8$ in which the outer side parts of the V-shaped members $f^7$ and the parts $f^8$ fit and operate.

With this construction the parts $f$ serve to reinforce the spring loop or bow members $b$, to strengthen the same, and also operate to prevent dirt, stones and other foreign substances from entering between said loop or bow members, and said parts $f$ also aid said loop or bow members $b$ to form a yielding support for the tire and tread member $c$.

The tire blocks shown in Fig. 7 are of the same general form as those shown in Figs. 1 to 4 inclusive but, in the construction shown in Fig. 7 the hook members $c^6$ and $c^7$ are smaller than in the construction shown in Figs. 1 to 4, and said tire blocks are provided at one end with laterally directed fingers $g$ inwardly of which are transverse recesses $g^2$, and at the opposite end said tire blocks are provided with hooks $g^3$, and the hooks $g^3$ at one end of said tire blocks enter the recesses $g^2$ at the corresponding end of another tire block and engage the corresponding fingers $g$, as clearly shown.

In this form of construction the tire blocks are also provided in their opposite side edges with recesses $g^5$ which communicate with the apertures $c^5$, and this will permit the insertion of the plugs $d$ laterally into said recesses, the shape of said plugs and the sizes of the apertures $c^5$ and the recesses $g^5$ permitting of this operation.

A wheel provided with a rim and tire construction of the class shown and described herein will possess all the necessary elasticity, and the tire or tread portion thereof together with the parts by which it is supported may be disconnected and taken apart for repair or other purposes when necessary, and in separating the separate tire blocks or members $c^2$ a suitable tool or instrument is passed inwardly through the apertures $c^9$ and through the recesses $c^8$ of the hook members $c^6$ and $c^7$ and used as a lever for the separation of the tire blocks at the ends thereof provided with said hook members, after which the disconnection or separation of said tire blocks at their opposite ends may be easily effected and the tool or instrument above referred to for separating the tire blocks at the ends thereof provided with a hook member $c^6$ and $c^7$ may also be used in the same way for connecting said tire blocks at said ends.

While I have described the construction which I prefer, my invention is not limited to the exact details of construction herein shown and described, and changes herein and modifications thereof may be made, within the scope of the appended claims, without departing from the spirit of the invention or sacrificing its advantages.

Having fully described my invention, what I claim as new and desire to secure by Letters Patent, is:—

1. In a wheel rim and tire construction, a rim, transversely arranged spring loop or bow members open at their inner sides and connected with said rim and between which are radial open spaces, a flexible tread member mounted on said spring or bow members and inclosing the same, and curved supplemental flat spring members detachably mounted on the outer sides of the spring loop or bow members and inclosing said spaces and detachably connected with the rim and with the outer parts of the spring loop or bow members adjacent to the tread member and having tongues which project under the opposite edge portions of the tread member.

2. In a wheel rim and tire construction, a rim, a flexible tread member, spring loop or bow members connected with said rim and on which said tread member is mounted and between which are radial open spaces, said parts being detachably connected, said tread member being composed of separate blocks, the ends of which are provided with central interlocking hook members whereby they are detachably connected, and curved supplemental spring members of less width than said spring loop or bow members and adapted to inclose said spaces and being detachably connected with said rim, the separate parts of said tread member and the outer parts of said spring loop or bow members.

3. In a wheel rim and tire construction, a rim, a flexible tread member, and spring loop or bow members connected with said rim and on which said tread member is mounted and between which are radial open spaces, said parts being detachably connected and said tread member being composed of separate blocks which are rectangular in form and are provided centrally of one end thereof with transverse apertures, the ends of said blocks being provided with central interlocking devices and the corner portions of said blocks being also provided with supplemental interlocking devices.

4. In a wheel rim and tire construction, a rim, transversely arranged spring loop or bow members open at their inner ends and detachably connected with said rim and between which are radial open spaces, a flexible tread member composed of separate blocks which are rectangular in form and the ends of which are provided with central interlocking hook members whereby they are detachably connected, and supplemental spring loop or bow members detachably connected with said rim, the separate parts of said tread member and the outer parts of said spring loop or bow members and adapted to inclose said spaces.

In testimony that I claim the foregoing as my invention I have signed my name in presence of the subscribing witnesses this 11th day of February, 1916.

RICHARD WUNNING.

Witnesses:
C. MULREANY,
H. E. THOMPSON.

Copies of this patent may be obtained for five cents each, by addressing the "Commissioner of Patents, Washington, D. C."